(12) United States Patent
Wiggs

(10) Patent No.: US 8,712,774 B2
(45) Date of Patent: Apr. 29, 2014

(54) SYSTEMS AND METHODS FOR GENERATING A HYBRID TEXT STRING FROM TWO OR MORE TEXT STRINGS GENERATED BY MULTIPLE AUTOMATED SPEECH RECOGNITION SYSTEMS

(75) Inventor: Jonathan Wiggs, Olympia, WA (US)

(73) Assignee: Nuance Communications, Inc., Burlington, MA (US)

( * ) Notice: Subject to any disclaimer, the term of this patent is extended or adjusted under 35 U.S.C. 154(b) by 1004 days.

(21) Appl. No.: 12/749,335

(22) Filed: Mar. 29, 2010

(65) Prior Publication Data

US 2010/0250250 A1  Sep. 30, 2010

Related U.S. Application Data

(60) Provisional application No. 61/211,148, filed on Mar. 30, 2009.

(51) Int. Cl.
*G10L 15/00* (2013.01)
*G10L 15/04* (2013.01)
*G10L 15/26* (2006.01)

(52) U.S. Cl.
CPC .............. *G10L 15/005* (2013.01); *G10L 15/04* (2013.01); *G10L 15/265* (2013.01)
USPC ........................... 704/253; 704/251; 704/252

(58) Field of Classification Search
CPC ........ G10L 15/05; G10L 15/04; G10L 15/265
USPC ................................................. 704/251, 253
See application file for complete search history.

(56) References Cited

U.S. PATENT DOCUMENTS

| | | | | |
|---|---|---|---|---|
| 7,149,689 | B2 * | 12/2006 | Yacoub | 704/255 |
| 7,831,425 | B2 * | 11/2010 | Acero et al. | 704/251 |
| 7,908,141 | B2 * | 3/2011 | Belknap | 704/235 |
| 8,244,533 | B2 * | 8/2012 | Kiuchi et al. | 704/253 |
| 8,326,631 | B1 * | 12/2012 | Watson | 704/270 |
| 2002/0143536 | A1 * | 10/2002 | Chien et al. | 704/251 |
| 2003/0088397 | A1 * | 5/2003 | Karas et al. | 704/1 |
| 2004/0153319 | A1 * | 8/2004 | Yacoub | 704/240 |
| 2005/0010412 | A1 * | 1/2005 | Aronowitz | 704/254 |
| 2005/0080613 | A1 * | 4/2005 | Colledge et al. | 704/9 |
| 2005/0108012 | A1 * | 5/2005 | Roth et al. | 704/252 |
| 2007/0198259 | A1 * | 8/2007 | Karas et al. | 704/235 |
| 2008/0243507 | A1 * | 10/2008 | Gopinath et al. | 704/257 |
| 2010/0082333 | A1 * | 4/2010 | Al-Shammari | 704/10 |
| 2010/0121638 | A1 * | 5/2010 | Pinson et al. | 704/235 |

* cited by examiner

*Primary Examiner* — Douglas Godbold
*Assistant Examiner* — Michael Ortiz-Sanchez
(74) *Attorney, Agent, or Firm* — Perkins Coie LLP

(57) ABSTRACT

A hybrid text generator is disclosed that generates a hybrid text string from multiple text strings that are produced from an audio input by multiple automated speech recognition systems. The hybrid text generator receives metadata that describes a time-location that each word from the multiple text strings is located in the audio input. The hybrid text generator matches words between the multiple text strings using the metadata and generates a hybrid text string that includes the matched words. The hybrid text generator utilizes confidence scores associated with words that do not match between the multiple text strings to determine whether to add an unmatched word to the hybrid text string.

24 Claims, 6 Drawing Sheets

SYSTEMS AND METHODS FOR GENERATING A HYBRID TEXT STRING FROM TWO OR MORE TEXT STRINGS GENERATED BY MULTIPLE AUTOMATED SPEECH RECOGNITION SYSTEMS

CROSS-REFERENCE TO RELATED APPLICATION(S)

This application claims the benefit of U.S. Provisional Application No. 61/211,148 filed on Mar. 30, 2009, which is incorporated herein by reference in its entirety.

BACKGROUND

Automated speech recognition (ASR) systems are used throughout many industries to convert spoken words into text. For example, ASR systems are used to automatically translate speech between languages, control computers, and convert voicemails into text. An ASR system receives as an input an analog audio signal, a digital audio signal, or other data representing audio, and produces a text string representing spoken words that it recognizes in the input. ASR systems generally perform this conversion by splitting an audio signal into small segments and matching the small segments to phonemes in the language to which spoken words from the audio are to be converted. The resulting phonemes are combined to identify words.

From an ideal audio source, some ASR systems can recognize spoken words with an accuracy approaching 99%. However, various conditions or characteristics associated with an audio source can reduce an ASR system's recognition rate. For example, an ASR system may not recognize a word because of background noise or because of a speaker's thick accent. While some applications can tolerate an ASR system that misrecognizes an occasional word, in other applications, such as in military, health care, or communications applications, a misrecognized word can cause serious harm.

Existing ASR systems employ different algorithms to compensate for suboptimal audio sources or input. As a result, some ASR systems perform better under certain conditions than others. For example, a first ASR system might recognize words with a high accuracy from an audio sample in which a person speaks fast while a second ASR system recognizes few words from the same audio sample. However, the second ASR system might recognize more words than the first ASR system when the person talks with an accent. Unfortunately, despite years of research and development, no single ASR system is dynamic and sophisticated enough to realize near-perfect recognition rates under suboptimal conditions.

DETAILED DESCRIPTION

Figure 1:
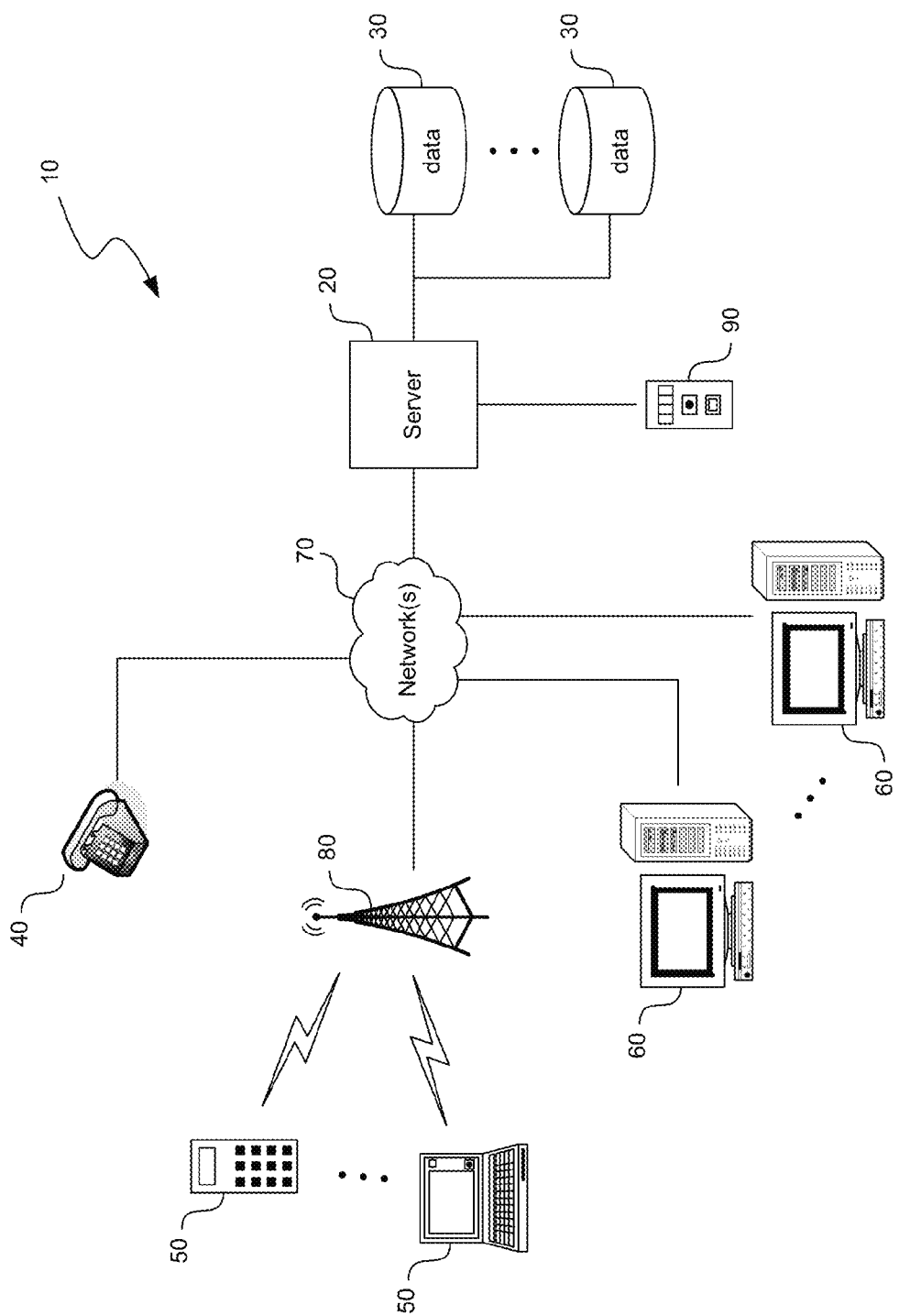
FIG. 1 is a diagram of a suitable environment in which a hybrid text generator operates.

A brief overview of some implementations and aspects of the invention are first presented. Following the brief overview are examples of suitable systems in which implementations of the invention may be practiced. A block diagram is then discussed with specific reference to components of an implementation of the invention. Finally, a flow diagram of a process that is executed by implementations of the invention is described with reference to specific examples of the invention.

A. Overview

A hybrid text generator is described that generates a hybrid text string from multiple text strings that are produced by multiple ASR systems from an audio source. The multiple ASR systems include different ASR systems, a same ASR system having a different configuration among the multiple ASR systems, or combinations thereof. The hybrid text string that the hybrid text generator produces includes words from the multiple text strings, such as words that match between the multiple text strings.

In some implementations, metadata is associated with each of the multiple text strings. The metadata identifies a start time that each word in a text string begins in the audio source and a duration of each word in the audio source. In some implementations, the metadata includes a confidence score associated with each word in a text string, representing how confident an ASR system is that it accurately recognized a word.

In one example, the hybrid text generator performs initialization, such as normalizing and pre-processing the multiple text strings by removing case in all words, converting numbers to words, removing extraneous spaces, removing punctuation, etc. The hybrid text generator then constructs a word map from the multiple text strings. The word map is a matrix or data structure that correlates each word from the multiple text strings to a time location that the words are spoken in the audio source. The hybrid text generator identifies anchor words and anchor word points using the word map. An anchor word is a word that the hybrid text generator can confidently match between the multiple text strings. For example, the hybrid text generator identifies an anchor word by searching a first text string of the multiple text strings for a word that is rarely used in a language of the audio source. The hybrid text generator then searches for the rarely used word in a second text string at a time location in the second text string that is within a search range of a time location that the word is located at in the first text string.

In this example, the hybrid text generator then calculates the search range by adding an offset between the first and second text strings to an error margin. If the hybrid text generator finds the rarely used word in both text strings within the search range, the hybrid text generator identifies the word as an anchor word and identifies a corresponding anchor word point. The anchor word point is a time location that the anchor word begins in the word map. The anchor word point may differ between the first and second text strings.

In this example, the hybrid text generator next compares the anchor word point corresponding to the first text string with the anchor word point corresponding to the second text string to compute a match vector between the text strings. The match vector indicates a time offset between the first and second text strings. In instances where the hybrid text generator finds multiple anchor words in a word map, the match vector is calculated as an average of the differences between anchor word points of the first text string and the second text string. The hybrid text generator attempts to match words from the first text string with words from the second text string that are located in the second text string at time locations equivalent to time locations of the words in the first string plus the match vector and a margin of error. The hybrid text generator identifies any matching words as confident match words.

The hybrid text generator identifies boxed match ranges in an attempt to match words from the first text string with words from the second text string that are located outside the match vector and margin of error. A boxed match range includes a word that is surrounded on either side in the word map by a confident match word, an anchor word, a beginning of a text string, or an end of the text string. The hybrid text generator identifies a word that matches between the first and second text strings within a boxed match range as a confident match word. The hybrid text generator identifies words that do not match between the first and second text strings within a boxed match range as an unconfident match. The hybrid text generator identifies an area within the text strings that cannot be matched as an area of uncertainty.

The hybrid text generator adds confident match words and anchor words to the hybrid text string at a location at which the words were located in the first and second text strings. The hybrid text generator attempts to resolve unconfident matches and areas of uncertainty by analyzing confidence scores associated with words of the unconfident match and the areas of uncertainty. In some implementations, if a word of an unconfident match in the first text string is associated with a confidence score that is higher than a confidence score associated with a corresponding word of the unconfident match in the second text string, the word from the first text string is added to the hybrid text string. In some implementations, an area of uncertainty contains multiple words for each text string and an average confidence score is calculated for the multiple words from confidence scores associated with the words in that string. If words in an area of uncertainty within the first text string have a higher average confidence score than words in the area of uncertainty within the second text string, the words within the first text string are added to the hybrid text string. In some implementations, the hybrid text generator adds all words associated with the area of uncertainty or unconfident match to the hybrid text string. The hybrid text generator may output the hybrid text string after it adds the words from the first and second text strings to the hybrid text string. In almost all circumstances, the hybrid text string is statistically superior to any of the individual text strings that are input in the hybrid string generator.

B. Implementations of the Invention

Various implementations of the invention will now be described. The following description provides specific details for a thorough understanding and an enabling description of these implementations. One skilled in the art will understand, however, that the invention may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the invention.

FIG. 1 and the following discussion provide a brief, general description of a suitable computing environment 10 in which a hybrid text generator can be implemented. Although not required, aspects and implementations of the invention will be described in the general context of computer-executable instructions, such as routines executed by a general-purpose computer, e.g., a server or personal computer. Those skilled in the relevant art will appreciate that the invention can be practiced with other computer system configurations, including Internet appliances, set-top boxes, hand-held devices, wearable computers, mobile phones, multiprocessor systems, microprocessor-based systems, minicomputers, mainframe computers, or the like. The invention can be embodied in a special purpose computer or data processor that is specifically programmed, configured, or constructed to perform one or more of the computer-executable instructions explained in detail below. Indeed, the term "computer", as used generally herein, refers to any of the above devices as well as any data processor or any device capable of communicating with a network, including consumer electronic goods such as gaming devices, cameras, or other electronics having a data processor and other components, e.g., network communication circuitry. Data processors include programmable general-purpose or special-purpose microprocessors, programmable controllers, application specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic or optical based disks, flash memory devices, or any other type of non-volatile storage medium or non-transitory medium for data. Software may include one or more program modules which include routines, programs, objects, components, data structures, and so on that perform particular tasks or implement particular abstract data types.

The invention can also be practiced in distributed computing environments, where tasks or modules are performed by remote processing devices, which are linked through a communications network, such as a Local Area Network ("LAN"), Wide Area Network ("WAN") or the Internet. In a distributed computing environment, program modules or subroutines may be located in both local and remote memory storage devices. Aspects of the invention described below may be stored or distributed on tangible, non-transitory computer-readable media, including magnetic and optically readable and removable computer discs, stored in firmware in chips (e.g., EEPROM chips). Alternatively, aspects of the invention may be distributed electronically over the Internet or over other networks (including wireless networks). Those skilled in the relevant art will recognize that portions of the invention may reside on a server computer, while corresponding portions reside on a client computer. Data structures and transmission of data particular to aspects of the invention are also encompassed within the scope of the invention.

Referring to FIG. 1, the hybrid text generator operates on one or more servers 20 or other computing devices that have a processor and a memory, such as one or more mobile devices 50 or one or more computers 60. The servers additionally include network cards or other devices that enable the servers to communicate through one or more networks 70. The servers 20 are connected to one or more data storage areas 30. Data storage areas 30 contain data pertaining to the hybrid text generator, such as dictionaries, word lists, contact lists or address books, and statistics related to word usage. Data storage areas 30 also contain software routines necessary to implement the technology disclosed herein.

The hybrid text generator receives audio input from a landline telephone 40, a mobile device 50, a computer 60, a voice recorder 90, or another device capable of recording audio or sending previously recorded audio through the networks 70 to the hybrid text generator. The telephone 40 communicates with the server 20 through the networks 70, including, for example, a public switched telephone network (PSTN). The mobile devices 50 communicate wirelessly with a base station or access point 80 using a wireless mobile telephone standard, such as the Global System for Mobile Communications (GSM), or another wireless standard, such as IEEE 802.11, and the base station or access point 80 communicates with the server 20 through the networks 70. The computer 60 communicates with the server 20 through the networks 70 using, for example, TCP/IP protocols. The voice recorder 90 connects to the server via, for example, a wireless communication standard, such as Bluetooth®, a wired connection, such as a Universal Serial Bus (USB) connection, or the like.

The hybrid text generator produces a hybrid text string from an audio source. In implementations in which the hybrid text generator operates on the one or more servers 20, the hybrid text generator may generate a hybrid text string and send it via the networks 70 to the mobile devices 50 or the computers 60. The mobile devices 50 and computers 60 include a display for displaying the hybrid text string. In some implementations, the server includes a display that presents the hybrid text string. In implementations where the hybrid text generator operates substantially solely on the one or more mobile devices 50 or the one or more computers 60, the hybrid text generator may send a hybrid text string to the servers 20 or to another mobile device 50 or computer 60 or store the text string locally. In some implementations, the hybrid text generator operates on the one or more mobile devices 50 or the one or more computers 60 and displays a hybrid text string on the computer 60 or mobile device 50 that the hybrid text string operates on.

Figure 2:
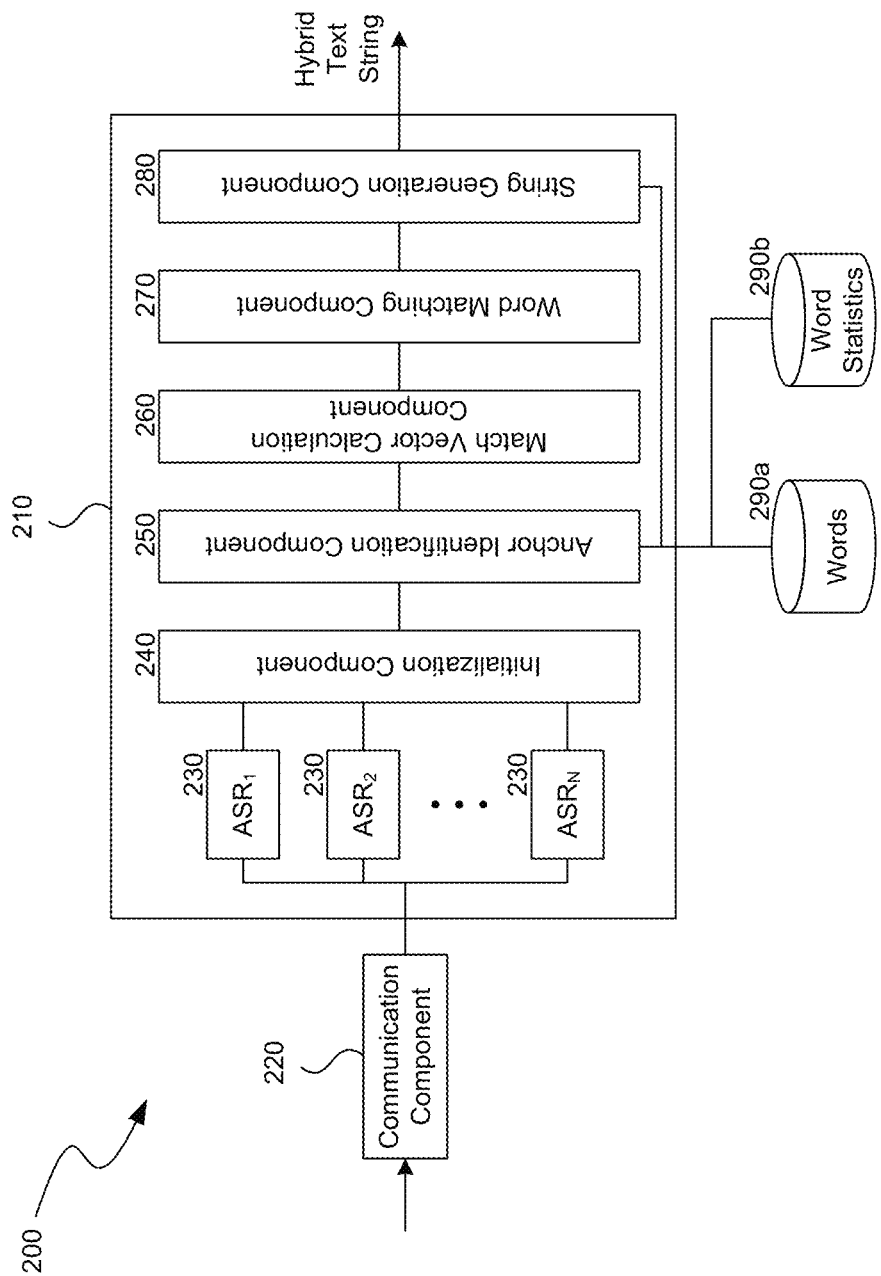
FIG. 2 is a block diagram of a hybrid text generator.

FIG. 2 is a block diagram 200 of various components of a hybrid text generator 210 according to one implementation. The hybrid text generator 210 generates a hybrid text string from multiple text strings that are produced by multiple ASR systems from an audio input. Under most circumstances, the hybrid text string more accurately represents spoken words from the audio input than does any of the multiple text strings that are output by the ASR systems. The following description of FIG. 2 explains some functionality of the various components of the hybrid text generator, and more detail regarding the components' functionality is discussed below with reference to FIGS. 3 and 4A-G.

In one example described below, the hybrid text generator 210 operates in the server 20 of FIG. 1, although the hybrid text generator 210 may operate separately on any other device or system, such as the computers 60, the mobile devices 50, the voice recorder 90, etc. The hybrid text generator 210 receives an audio input, such as a digital audio file or signal or an analog audio signal, via a communication component 220 that is associated with the server 20. In some implementations, the communication component is configured to receive audio input via the networks 70 from various devices, such as the landline telephone 40, the mobile devices 50, or the computers 60. In other implementations, the communication component is configured to receive audio input directly from a device, such as the voice recorder 90. In some implementations, the communication component 220 is configured to receive texts strings that have been generated by ASR systems operating remotely from the server 20. In other implementations, the server includes no communication component 220. For example, a communication component is unnecessary if the hybrid text generator operates on a device that captures an audio signal with a microphone and the audio signal is fed directly into the hybrid text generator 210, such as if the hybrid text generator operates on the mobile devices 50 or voice recorder 90.

The hybrid text generator includes multiple ASR systems 230 that convert spoken words from an audio input into text strings and generate metadata related to the audio input and the text strings. The ASR systems 230 may include, for example, a Vlingo® ASR system, a Nuance® ASR system, and an IBM® TALES ASR system. The ASR systems 230 receive audio input from the communication component 220 or from a microphone associated with the server 20. The ASR systems 230 differ from each other. For example, a first ASR system of the hybrid text generator may be a Nuance® system and a second ASR system of the hybrid text generator may be an IBM® TALES system. In some implementations, the ASR systems 230 are the same as each other, but an ASR algorithm of one ASR system is set or configured differently relative to another. For example, a first ASR system may be a Nuance® ASR system using default settings while a second ASR system may be a Nuance® ASR system with its settings altered so that it processes fast-paced speech better. In some implementations, the hybrid text generator 210 does not include any ASR systems and instead the hybrid text generator 210 receives text strings generated from ASR systems operating remotely from the server 20.

The hybrid text generator 210 also includes an initialization component 240, an anchor identification component 250, a match vector calculation component 260, a word matching component 270, and a string generation component 280, and it accesses data storage areas 290. The initialization component 240 is configured to receive and initialize multiple text strings. The text strings include time-related metadata describing each word in the text strings, such as a start time of the word in the audio input, a duration of the word in the audio input, and quality or confidence information associated with a word, such as a score that identifies how confident an ASR system is that it accurately recognized a word. The metadata may also describe information related to the audio input, such as a device that captured the audio, a person who speaks in the audio input, or a time that the audio was captured. In implementations where the hybrid text generator 210 includes ASR systems, the initialization component 240 receives the text strings from the ASR systems 230. In implementations in which external ASR systems generate text strings from an audio input, the initialization component 240 receives the text strings from the communication component 220.

The initialization component 240 is configured to preprocess and normalize the text strings that it receives. Doing so helps prevent the hybrid text generator 200 from falsely concluding that words do not match between the text strings. For example, the initialization component 240 is configured to remove the case in all words, convert numerals into text (e.g., convert "20" into "twenty"), remove punctuation in the text strings, and remove extraneous spaces or formatting in the text strings. The initialization component 240 is also configured to normalize confidence scores between ASR systems. For example, a first ASR system may rate confidence on a scale from zero to one, a second ASR system may rate confidence on a scale from one to five, and the initialization component 240 may normalize the confidence scores on a scale from zero to one. In some implementations, the initialization component 240 normalizes confidence scores based on empirical data associated with the ASR systems that produce the text strings. For example, if the initialization component 240 discovers through experimenting that an ASR system consistently skews confidence scores high relative to the ASR system's actual accuracy, the initialization component 240 can accordingly reduce confidence scores pertaining to text strings generated by the ASR system.

The initialization component 240 is also configured to construct a word map associated with each text string that it receives. As described further with respect to FIG. 4A below, a word map is a matrix or data set that maps words from multiple text strings to time locations in an audio input that the text strings were generated from. The anchor identification component 250, the match vector calculation component 260, the word matching component 270, and the string generation component 280 use the word map to generate a hybrid text string.

The anchor identification component 250 is configured to identify anchor words and anchor word points in the word map that is generated by the initialization component 240. An anchor word is a word that the hybrid text generator 210 is highly confident was recognized correctly by the ASR systems. An anchor word point is a time location that an anchor word begins in a word map. The hybrid text generator 210 uses anchor word points as reference points to identify a time offset in a word map between words of a first text string and corresponding words of a second text string. As explained further with reference to FIG. 4B, the anchor identification component 250 identifies an anchor word by comparing a word of a first text string to a word of a second text string that is located in the second text string at a time proximate to where the word is located in the first text string.

In some implementations, an anchor word is a word not commonly used in a language of the audio input. Rarely spoken words make strong anchor words because an ASR system is less likely to falsely recognize (i.e., mistakenly identify a word that was not spoken in an audio input) a rarely spoken word than it is to falsely recognize commonly spoken words. Further, two ASR systems are even less likely to falsely recognize the same rarely spoken word. The anchor identification component 250 maintains a list of words and word usage data in data storage areas 290. The anchor identification component 250 is configured to access data storage areas 290 to identify rarely spoken words. In some implementations the data storage areas 290a and 290b are one data storage area. In some implementations, the anchor identification component 250 identifies a word as rare if the word is used less frequently than 80% of all other words used in that language. In practice, a rarely used word is commonly a noun or proper noun, such as a person's name.

The match vector calculation component 260 is configured to identify a match vector, which is an offset in a word map between words of a first text string and corresponding words of a second text string. Words of a time-indexed text string (i.e., text strings having time-related metadata associated therewith) tend to be offset in time from words of another time-indexed text string produced from the same audio input, and the offset tends to remain consistent through the text strings. The match vector calculation component 260 is configured to determine this offset by computing an average difference between time locations of anchor word points from a first text string to time locations of the anchor word points in a second text string, as identified by the anchor identification component 250.

The word matching component 270 is configured to analyze a word map produced by the initialization component 240 to identify confident match words, boxed match ranges, and areas of uncertainty in multiple text strings represented in the word map. A confident match word is a word that the word matching component 270 identifies as matching between a first text string and a second text string. As explained further with reference to FIG. 4D, the word matching component 270 identifies confident match words by comparing words from the first text string to words from the second text string that are located within a variance range of where the word matching component 270 expects to find a matching word in the second text string.

A boxed match range is a word or words in a text string that is surrounded on both sides in a word map by a confident match word, an anchor word, a beginning of a text string, or an end of a text string. A boxed match range represents a word in a first text string and a word in a second text string that were not identified as an anchor word by the anchor identification component 250 and were not identified as a confident match word by the word matching component 270. If a word in a boxed match range of the first text string matches with a word in the boxed match range of the second text string, the word matching component 270 identifies the word as a confident match. If the words in the boxed range do not match, the word matching component 270 identifies the contents of the boxed range as an unconfident match—that is, the word matching component 270 is confident that the words in the boxed range are in the same location within the word map, but it cannot confidently identify the words of the boxed ranges. Similarly, an area of uncertainty is a portion of a first text string that the word matching component 270 cannot match with a portion of a second text string. For example, the word matching component 270 may not be able to match a portion of a first text string with a portion of a second text string if the portion of the first text string contains more words than the portion of the second text string.

The string generation component 280 receives the word map from the initialization component 240, anchor words from the anchor identification component 250, and confident match words, unconfident match words, and areas of uncertainty from the word matching component 270, and constructs an interim hybrid text string that the hybrid text generator 210 outputs. The string generation component 280 is configured to add every anchor word and confident match word to the hybrid text string. The string generation component 280 may order the words in the hybrid text string based on a location of the word in the word map or in the first and second text strings. The string generation component 280 also accesses and/or maintains data in the data areas 290, including, for example, as custom dictionaries, to help it construct the hybrid text string.

The string generation component 280 is also configured to compare confidence scores associated with each word of an unconfident match. In some implementations, the string generation component 280 adds a word of an unconfident match to the hybrid text string if that word has a higher confidence score than a corresponding word in the other text string. In some implementations, a confidence score associated with a word must meet a predetermined confidence score threshold in order for the word it to be added to the hybrid text string.

The string generation component 280 also analyzes areas of uncertainty to determine whether words from these areas should be added to the hybrid text string. The string generation component 280 evaluates confidence scores associated with the areas of uncertainty. In some implementations, the string generation component 280 is configured to compute an average of confidence scores for each word in an area of uncertainty of a text string. If an average confidence score associated with words in an area of uncertainty of a first text string is greater than an average confidence score associated with words in the area of uncertainty of a second text string, the string generation component 280 adds the words from the first text string in the area of uncertainty to the hybrid text string. In some implementations, the string generation component 280 generates a hybrid text string that is missing words, such as words from an area of uncertainty or an unconfident match vector. In some implementations, the string generation component 280 outputs the original text strings and/or audio input that the hybrid text string was generated from, or only portions of the original text strings or audio input that the string generation component 280 is uncertain about, for further processing, such as for review by a human transcriber.

Figure 3:
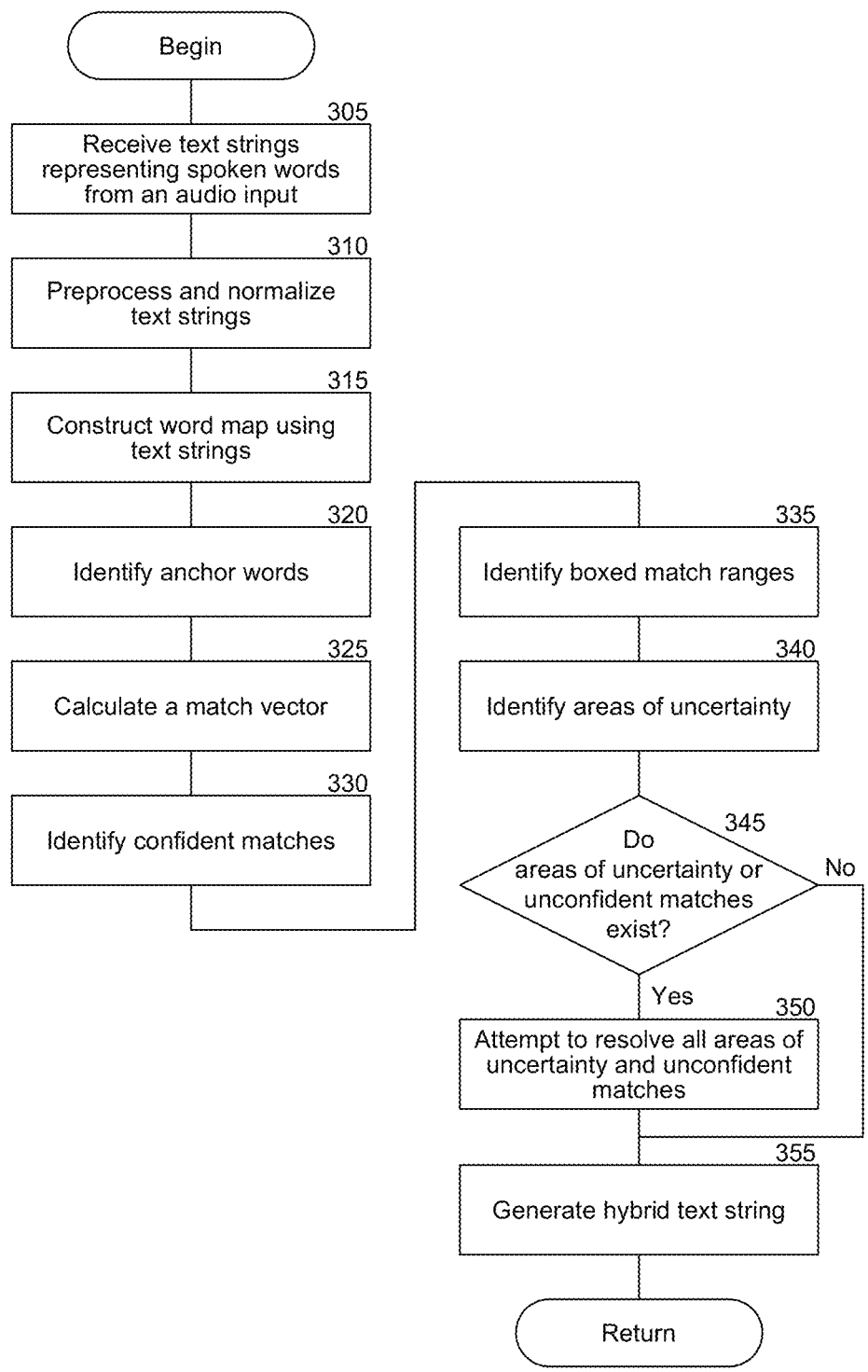
FIG. 3 is a flow diagram depicting an example of steps performed by a hybrid text generator to generate a hybrid text string from an audio source.

FIG. 3 is a flow diagram of a process 300 implemented by the hybrid text generator 210 to generate a hybrid text string from two text strings produced from an audio source. Although the process 300 is implemented using two text strings produced from the audio source, one skilled in the art will appreciate that the process 300 may be implemented using more text strings than two. At a block 305, the hybrid text generator 210 receives first and second text strings and metadata associated with the text strings. A first ASR system generates the first text string from an audio source and a second ASR system generates the second text string from the audio source. The first and second text strings represent spoken words from the audio source in an order that the first and second ASR systems perceive the words in the audio source. The first ASR system differs from the second ASR system. In some implementations, the difference is that the first and second ASR systems are entirely different products using different ASR algorithms. In some implementations, the difference is that the first ASR system and the second ASR system are the same product but the second ASR system is altered relative to the first. For example, the second ASR system may be configured to recognize accents better than the first ASR system does.

The first and second ASR systems produce the metadata associated with the first and second text strings. The metadata identifies a start time in the audio source of each word of the first and second text strings and a duration of each word of the first and second text strings in the audio source. In some implementations, the metadata includes a confidence value for each word of the first and second text strings. A confidence value for a word represents how confident an ASR system is that it accurately recognized the word.

At a block 310, the hybrid text generator 210 preprocesses and normalizes the first and second text strings. In some implementations, the hybrid text generator removes a case in all words of the first and second text strings (e.g., by changing words from uppercase to lowercase) and removes all punctuation from the text strings. In some implementations, the hybrid text generator normalizes numbers and symbols in the text strings. For example, the hybrid text generator converts "75%" into "seventy five percent." The hybrid text generator 210 also removes extraneous spaces in the text strings. The hybrid text generator also normalizes confidence scores associated with words in a text string.

Figure 4A:
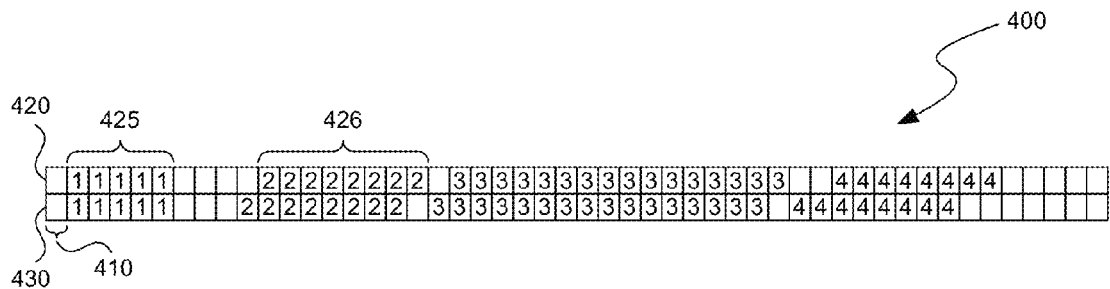
FIG. 4A is a representative diagram of a word map produced by a hybrid text generator from text strings generated by multiple automated speech recognition systems.

At a block 315, the hybrid text generator 210 constructs a word map that corresponds to the first and second text strings. FIG. 4A shows a representative word map 400 that includes a first row 420 that represents time locations of words from a first text string and a second row 430 that represents time locations of words from a second text string. The word map is divided into time slots 410, each of which represents a fixed duration of time, such as a millisecond or centisecond. The hybrid text generator 240 maps words from the text strings to time slots 410 according to time-related metadata associated with the text strings, such as metadata representing a start time and duration of each of the words in the audio input. In the representative word map 400, unique identifiers represent words of the text strings. For example, a first word 425 of each text string is represented by a "1", a second word 426 of each text string is represented by a "2", and so on. In the representative word map 400, the time slots 410 represent 10 milliseconds and the first word 425 is 50 milliseconds long in the audio input. Therefore, the initialization component 240 maps the first word 425 to five consecutive time slots. Forty milliseconds separate the first word and the second word in the audio input according to the first text string, so four time slots appear between the first word 425 and the second word 426 in the first row 420 of the word map 400.

Returning to FIG. 3, at a block 320, the hybrid text generator 210 identifies matching pairs of anchor words and anchor word points between the two text strings within the word map. An anchor word point represents a location in the word map that an anchor word begins. An anchor word is a word that the hybrid text generator 210 is confident matches between the text strings. In some implementations, the hybrid text generator 210 identifies an anchor word by searching for rarely used words in a first text string. If a rarely used word is identified in the first text string, the hybrid text generator 210 searches within a search range in the word map for a time slot representing the rarely used word in the second text string. The hybrid text generator 210 determines the search range by adding a starting variance between the first and second text strings to a predetermined margin of error. In some implementations, the predetermined margin of error is between 0.2 and 0.4 seconds. The starting variance is equal to a difference between starting offsets of the first and second text strings. For example, a starting variance is equal to a difference between a starting time slot of a first word of a first text string and a starting time slot of a first word of a second text string. In some implementations, an ending variance is determined in addition to or in substitute of the starting variance, and the ending variance is equal to a difference between ending offsets of the first and second text strings.

Figure 4B:
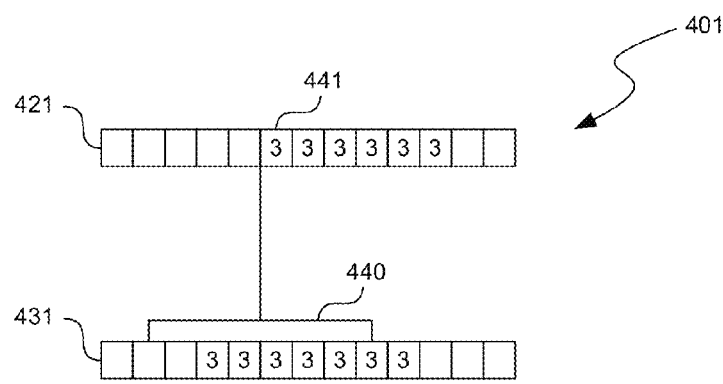
FIG. 4B is a representative diagram of a word map produced by a hybrid text generator from text strings generated by multiple automated speech recognition systems and showing a search range for an anchor word.

FIG. 4B shows a representative word map 401 that includes a search range 440 positioned over a second row 431 of the word map 401 that corresponds to a second text string. The search range 440 is slightly larger than six time slots. The hybrid text generator 210 has identified a word of a first text string as a rarely used word. The hybrid text generator 210 locates a time slot 441 at which the rarely used word begins in the first row 421 of the word map 401. The hybrid text generator 210 searches within the search range 440 for time slots in the second row 431 that correspond to the rarely used word in the second text string. The hybrid text generator 210 designates the rarely used word as an anchor word if it finds the rarely used word in the second text string and it corresponds to a time slot that is within the search range in the second row 431 of the word map 401. In instances where the hybrid text generator 210 does not find an anchor word within the word map, the hybrid text generator 210 may broaden its definition of a rarely used word and search for an anchor word again. For example, if the hybrid text generator is unable to find an anchor word by searching for a word in the first text string that is used less frequently than 80% of all other words of a word list, the hybrid text generator may search for an anchor word again by searching for a word in the first text string that is used less frequently than 70% of all other words of the word list. In some implementations, the hybrid text generator 210 identifies multiple anchor words in the word map.

Figure 4C:
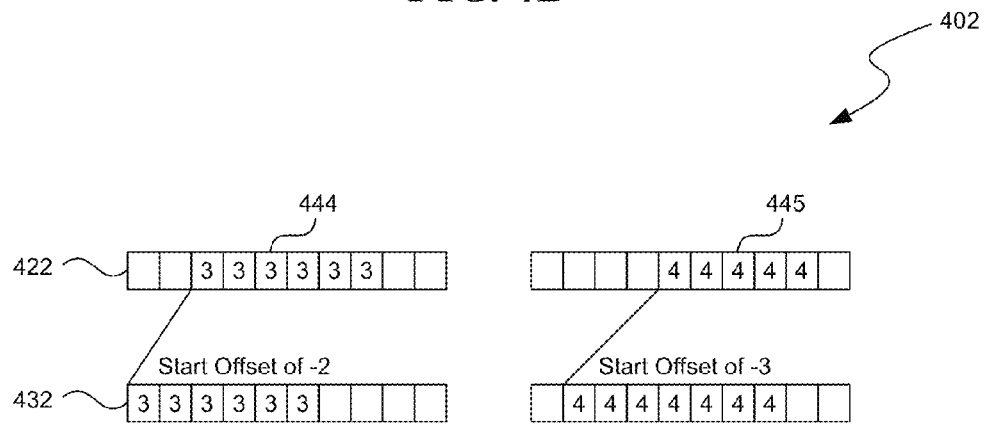
FIG. 4C is a representative diagram of a word map produced by a hybrid text generator from text strings generated by multiple automated speech recognition systems and showing variances between anchor word points which are used to calculate a match vector.

After anchor word points are identified, at a block 325, the hybrid text generator 210 calculates a match vector. The match vector represents a time offset in the word map between words of the first text string and corresponding words of the second text string. FIG. 4C shows a representative word map 402 that includes a first anchor word 444 and a second anchor word 445. The first anchor word 444 is offset in a second row 432 of the word map 402 by minus two time slots from the first anchor word in a first row 422 of the word map 402. The second anchor word 445 is offset in the second row 432 of the word map 402 by minus three time slots from the second anchor word in the first row 422 of the word map. The hybrid text generator 210 calculates a match vector for the word map 402 by averaging offsets of anchor word points between the first row 422 and the second row 433. Therefore, since the offset of the first anchor word 444 is minus two time slots and the offset of the second anchor word 445 is minus three time slots, the match vector for the word map 402 is equal to minus two and a half time slots.

Figure 4D:
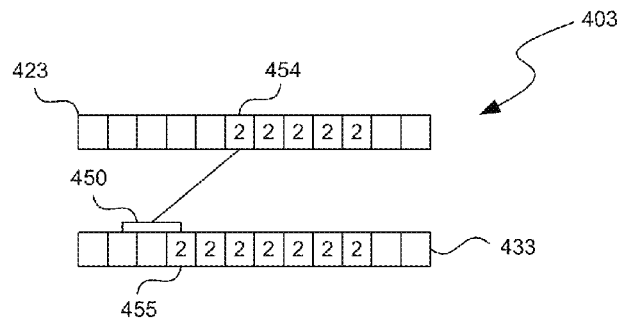
FIG. 4D is a representative diagram of a word map produced by a hybrid text generator from text strings generated by multiple automated speech recognition systems and showing a variance range for confident match words.

At a block 330, the hybrid text generator 210 identifies confident match words. The hybrid text generator 210 identifies a confident match word by comparing a word from the first text string to a word from the second text string that is represented in the word map at a time slot that is within a variance range of a time slot associated with the word from the first text string. The word from the first text string is a confident match word if it matches a word in the second text string and is represented in the word map at a time slot that is within the variance range. The variance range is equivalent to the match vector plus or minus the predetermined margin of error used to identify anchor word points at block 320. FIG. 4D shows a representative word map 403 that exhibits a variance range 450 that is used to find a confident match word. A first row 423 of the word map 403 corresponds to a first text string and a second row 433 corresponds to a second text string. A first time slot 454 corresponds to a beginning of a word in the first text string. The variance range 450 is offset from the first time slot 454 by minus two and a half time slots, which is equal to a match vector associated with the word map 403. The variance range 450 is almost three time slots wide, corresponding to a predetermined margin of error for the word map 403. Because a second time slot 455 corresponds to a word in the second text string that is located within the variance range 450, the word in the first text string that corresponds to the first time slot 454 is compared to the word in the second time string that corresponds to the second time slot 455. If the word in the first text string and the word in the second text string match, the hybrid text generator 210 identifies the word as a confident match word.

Figure 4E:
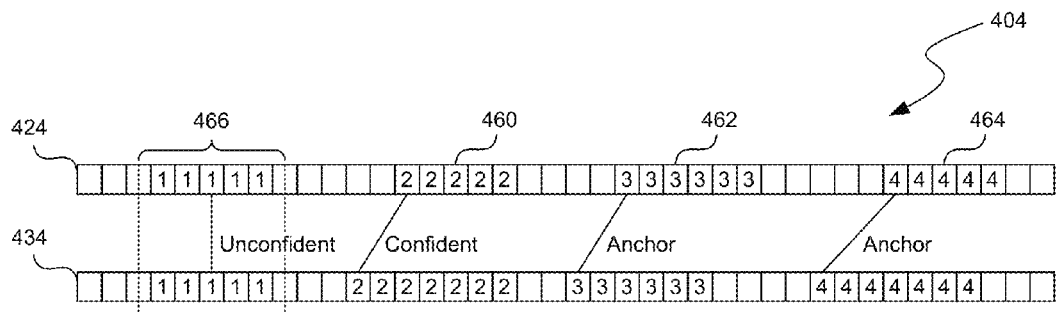
FIG. 4E is a representative diagram of a word map produced by a hybrid text generator from text strings generated by multiple automated speech recognition systems and showing boxed match locations.

Returning to FIG. 3, at a block 335, the hybrid text generator 210 identifies boxed match ranges in the word map. The hybrid text generator 210 identifies a boxed match range by locating every word in the word map that is surrounded on both sides by a confident match, an anchor word, a beginning of a text string, an end of a text string, or any other area or point that the hybrid text generator can confidently match between the two text strings. The hybrid text generator 210 compares a word from a boxed match range of a first text string to a word from a corresponding boxed match range of a second text string and designates the words as a confident match word if the words match. If the words do not match, the hybrid text generator 210 designates the boxed match range as an unconfident match. FIG. 4E shows a representative word map 404 that identifies a confident match word 460, a first anchor word 462, a second anchor word 464, and a boxed match range 466. A first row 424 corresponds to a first text string and a second row 434 corresponds to a second text string. The boxed match range 466 is surrounded by a beginning of the text strings and the confident match word 460. The boxed match range 466 represents an unconfident match because a word from the first text string that corresponds to time slots in the boxed match range 466 differs from a word from the second test string that corresponds to time slots in the boxed match range 466.

Figure 4F:
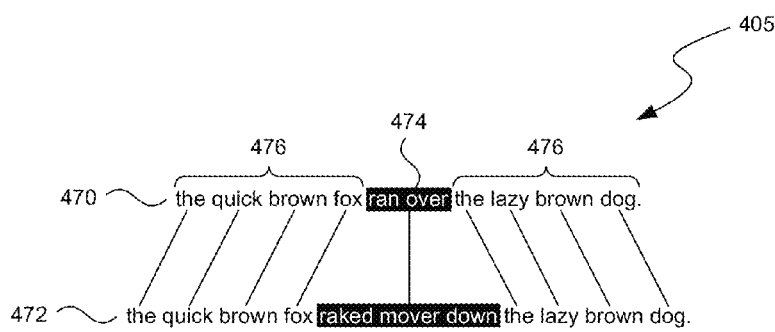
FIG. 4F is a representative diagram of two text strings processed by a hybrid text generator and showing areas of uncertainty within the first and the second text strings.

At a block 340, the hybrid text generator 210 identifies areas of uncertainty between the first and second text strings. An area of uncertainty includes an area in the first text string that cannot be matched with an area in the second text string. FIG. 4F shows a representative diagram 405 that includes an area of uncertainty 474 between the first text string 470 and the second text string 472. The area of uncertainty 474 is surrounded by matched words 476 of the first text string 470 and the second text string 472 (e.g., anchor words and confident match words). Words in the first text string 470 that are within the area of uncertainty 474 do not match words in the second text string 470 that are within the area of uncertainty 474. Furthermore, the first text string 470 includes fewer words within the area of uncertainty 474 than the second text string 472 does. Therefore, the hybrid text generator 210 is unable to determine which, if any, of the text strings includes accurately recognized words within the area of uncertainty 474.

At a decision block 345, the hybrid text generator 210 determines whether any unconfident matches or areas of uncertainty exist between the first and second text strings. If no unconfident matches or areas of uncertainty exist between the text strings, the process 300 proceeds to a block 355, and the hybrid text generator 210 generates a hybrid text string containing the anchor words and confident match words identified in the process 300. If an unconfident match or an area of uncertainty exists between the text strings, the process 300 proceeds to a block 350, where the hybrid text generator 210 attempts to reconcile the unconfident matches and/or areas of uncertainty.

The hybrid text generator 210 attempts to resolve an unconfident match by comparing a confidence score associated with a word of the unconfident match from the first text string with a confidence score associated with of a word of the unconfident match from the second text string. In some implementations, if the confidence score associated with the word of the unconfident match from the first text string is greater than the confidence score associated with the word of the unconfident match from the second text string, the hybrid text generator 210 resolves the unconfident match in favor of the word of the unconfident match from the first text string. In some implementations, the hybrid text generator 210 does not resolve an unconfident match in favor of a word unless a confidence score associated with the word is greater than a confidence score threshold value.

The hybrid text generator 210 also attempts to resolve an area of uncertainty by comparing confidence scores of words within the area of uncertainty. In some implementations, the hybrid text generator 210 compares an average of confidence scores for words of the first text string within the area of uncertainty with an average of confidence scores for words within the corresponding area of uncertainty of the second text string. In some implementations, if the average of confidence scores for words of the first text string within the area of uncertainty is greater than the average of confidence scores for words of the second text string within the area of uncertainty, the hybrid text generator 210 resolves the area of uncertainty in favor of the words from the first text string. In some implementations, an average of confidence scores for words of a text string within an area of uncertainty must be greater than a threshold confidence score value for the hybrid text generator 210 to resolve the area of uncertainty in favor of the text string (e.g., greater than about 65%). In some implementations, each word of a text string within an area of uncertainty must have a confidence score greater than a threshold value if the hybrid text generator 210 is to resolve the area of uncertainty in favor of the text string. In some implementations, the hybrid text generator 210 resolves the area of uncertainty in favor of a portion of words from the area of uncertainty.

Figure 4G:
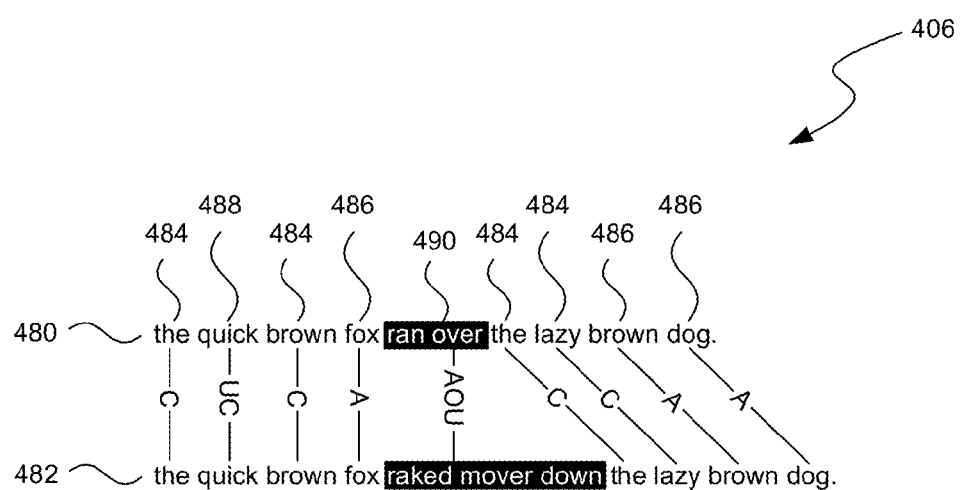
FIG. 4G is a representative diagram of two text strings processed by a hybrid text generator showing confident match words, unconfident match words, anchor word points, and areas of uncertainty within the two text strings.

At block 355, the hybrid text generator 210 generates the hybrid text string. The hybrid text generator 210 adds all anchor words and confident match words to the hybrid text string. The hybrid text generator 210 also adds to the hybrid text string any unconfident match words and words from areas of uncertainty that the hybrid text generator was able to resolve at block 350. The words in the hybrid text string are ordered within the hybrid text string depending on where the words were located within the first and second text strings. For example, an anchor word that was a first word in the first and second text strings will be a first word in the hybrid text string. FIG. 4G shows a representative diagram 406 of a first text string 480 and a second text string 482 after a hybrid text generator has identified all anchor words 486, confident match words 484, unconfident match words 488, and areas of uncertainty 490 between the text strings. In the example depicted in FIG. 4G, a confidence score associated with "quick" is greater than a confidence score associated with "quack," so the hybrid text generator resolves the unconfident match 488 in favor of "quick." Similarly, an average confidence score for "ran over" is greater than an average confidence score for "raked mover down," so the hybrid text generator resolves the area of uncertainty in favor of "ran over." The hybrid text generator adds the confident match words 484, anchor words 486, "quick," and "ran over" to the hybrid text string to generate a final hybrid text string that reads, "the quick brown fox ran over the lazy brown dog."

In some implementations, the hybrid text generator does not resolve areas of uncertainty or unconfident matches and it generates a final hybrid text string that includes placeholders identifying where areas of uncertainty and unconfident matches exist. In some implementations, a hybrid text generator does not resolve areas of uncertainty or unconfident matches and it instead includes disagreeing words from an area of uncertainty or unconfident match in the hybrid text string. For example, an unconfident match may include the words "quick" and "quack," and a hybrid text generator may generate a text string that states "the [quick/quack] brown fox ran over the lazy dog."

In some implementations, the hybrid text generator includes a grammar checking routine that analyzes words of an area of uncertainty and words that have already been added to a hybrid text string (e.g., anchor words) and resolves the area of uncertainty in favor of words in the area of uncertainty that render the hybrid text string grammatically correct. In some implementations, the hybrid text generator maintains a custom dictionary to track words used by a particular person or from a particular context. The hybrid text generator may resolve areas of uncertainty or unconfident matches using the custom dictionary or based on context. For example, if the audio input includes metadata indicating that the input is a voicemail and an unconfident match includes the word "call" from a first text string and the word "calm" from a second text string, the hybrid text generator may resolve the unconfident match in favor of "call" because according to the context it is more likely that "call" will be used in a voicemail context than "calm." In some implementations, the hybrid text generator accesses or maintains a custom dictionary that includes names or entries from an address book or contact list and uses the custom dictionary to resolve unmatched words, such as an unconfident match. For example, the hybrid text generator may compare words from an unconfident match or an area of uncertainty to entries in the address book or contact list and adds a word to the hybrid text string if it appears in both the unconfident match or area of uncertainty and the address book or contact list. In some implementations, an audio input to the hybrid text generator or text strings generated from the audio input are associated with metadata that identifies a person associated with the audio input, such as a person speaking in the audio input. The hybrid text generator may use the metadata that identifies the person to identify or maintain a custom dictionary that the hybrid text generator may use to resolve unconfident matches or areas of uncertainty.

In some implementations, a hybrid text generator generates a hybrid text string from three or more text strings generated by three or more ASR systems from an audio input. The hybrid text generator may implement a process similar to the process 300 described with respect to FIG. 3 to generate a hybrid text string from the three or more text strings. In some implementations, the hybrid text generator generates a first hybrid text string from two of the three or more text strings and generates a second hybrid text string from a third of the three or more text strings and the first hybrid text string.

Those skilled in the art will appreciate that the actual implementation of a data storage area may take a variety of forms, and the phrase "data storage area" is used herein in the generic sense to refer to any area that allows data to be stored in a structured and accessible fashion using such applications or constructs as databases, tables, linked lists, arrays, and so on. Those skilled in the art will further appreciate that the depicted flow charts may be altered in a variety of ways. For example, the order of the blocks may be rearranged, blocks may be performed in parallel, blocks may be omitted, or other blocks may be included.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to pursue additional claims after filing this application to pursue such additional claim forms, in either this application or in a continuing application.

I claim:

1. A method of creating a hybrid text string, wherein the method is performed by a computing system having a processor and a memory, the method comprising:
receiving a first time-indexed text string generated from an audio input by a first automated speech recognition system;
receiving a second time-indexed text string generated from the audio input by a second automated speech recognition system;
identifying at least one anchor word, wherein the at least one anchor word is associated with an anchor word point,
   wherein the at least one anchor word is a word having a high probability of being correctly recognized by both the first and second automated speech recognition systems, and,
   wherein the anchor word point is located at a time location $t_1$ in the first time-indexed text string and at a time location $t_2$ in the second time-indexed text string, wherein time locations $t_1$ and $t_2$ are different;
calculating a match vector, wherein the match vector is associated with a variance between the time location $t_1$ in the first time-indexed text string and the time location $t_2$ in the second time-indexed text string;
identifying at least one matched word, wherein the at least one matched word is located at a time location $t_3$ in the first time-indexed text string and at a time location $t_4$ in the second time-indexed text string,
   wherein time location $t_4$ is located within a second time range in the second time-indexed text string,
   wherein the second time range is generated by combining at least the time location $t_3$, the match vector, and a margin of error; and
creating a hybrid text string, wherein the hybrid text string includes the at least one anchor word and the at least one matched word, and wherein the hybrid text string includes at least one word from the first time-indexed text string that has a higher probability of being correctly recognized than a corresponding word in the second time-indexed text string.

2. The method of claim 1, further comprising
identifying an area of uncertainty within the first and second time-indexed text strings, wherein the area of uncertainty includes at least two words from the first time-indexed text string and at least one word from the second time-indexed text string;
receiving at least two confidence scores associated with the at least two words from the first time-indexed text string and a confidence score associated with the at least one word from the second time-indexed text string, and
computing an average of the at least two confidence scores associated with the at least two words from the first time-indexed text string, wherein the at least two words from the first time-indexed text string are included in the hybrid text string if the average of the at least two confidence scores associated with the at least two words from the first time-indexed text string is greater than the confidence score associated with the at least one word from the second time-indexed text string.

3. The method of claim 1, further comprising:
identifying a bounded match range within the first and second time-indexed text strings, wherein the bounded match range includes a first word from the first time-indexed text string, and a second word from the second time indexed text string,
wherein the first word and the second word are surrounded on both sides within the first or second time-indexed text strings by first and second boundaries, the boundaries defined by: a beginning of the first or second time-indexed text strings, an end of the first or second time-indexed text strings, an anchor word, or a matched word.

4. The method of claim 3, further comprising:
receiving a first confidence score and a second confidence score, wherein the first confidence score is associated with the first word and the second confidence score is associated with the second word, wherein the first word does not match the second word, and wherein the first word is included in the hybrid text string if the first confidence score is greater than the second confidence score and the first confidence score is greater than a predetermined threshold confidence score value.

5. The method of claim 3, wherein the first word matches the second word, and wherein the first word is included in the hybrid text string.

6. The method of claim 3, wherein the first word does not match the second word and both the first word and the second word are included in the hybrid text string.

7. The method of claim 1, further comprising:
identifying at least a second anchor word, wherein the second anchor word is associated with a second anchor word point, and wherein the second anchor word point is located at a time location $t_5$ in the first time-indexed text string and at a time location $t_6$ in the second time-indexed text string, wherein the match vector is also associated with a second variance between the time location $t_5$ in the first time-indexed text string and the time location $t_6$ in the second time-indexed text string.

8. The method of claim 1, further comprising:
initializing the first time-indexed text string and the second time-indexed text string, wherein initializing includes at least one of removing case from words of the first time-indexed text string and the second time-indexed text string, removing punctuation from the first time-indexed text string and the second time-indexed text string, and normalizing numerals in the first time-indexed text string and the second time-indexed text string into text.

9. The method of claim 1, wherein the first automated speech recognition system and the second automated speech recognition system comprise a same automated speech recognition system, wherein the first automated speech recognition system includes a different configuration from the second automated speech recognition system.

10. The method of claim 1, wherein the first automated speech recognition system and the second automated speech recognition system comprise different automated speech recognition systems.

11. A system for creating a hybrid text string, the system comprising:
an initialization component configured to:
receive a first time-indexed text string generated from an audio input by a first automated speech recognition system; and
receive a second time-indexed text string generated from the audio input by a second automated speech recognition system;
an anchor identification component configured to:
identify an anchor word, wherein the anchor word is associated with an anchor word point, and wherein the anchor word point is located at a time location $t_1$ in the first time-indexed text string and at a time location $t_2$ in the second time-indexed text string,
wherein time locations $t_1$ and $t_2$ are different, and,
wherein the anchor word is a word having a high probability of being correctly recognized by both the first and second automated speech recognition systems;
a match vector calculation component configured to:
calculate a match vector, wherein the match vector is associated with a variance between the time location $t_1$ in the first time-indexed text string and the time location $t_2$ in the second time-indexed text string;
a word matching component configured to:
identify a matched word, wherein the matched word is located at a time location $t_3$ in the first time-indexed text string and at a time location $t_4$ in the second time-indexed text string, wherein the time location $t_4$ is located within a second time range in the second time-indexed text string, wherein the second time range is generated by a mathematical operation using at least the time location $t_3$, the match vector, and a margin of error; and
a string generation component configured to:
create a hybrid text string, wherein the hybrid text string includes at least the anchor word and the matched word.

12. The system of claim 11, wherein the initialization component is further configured to:
initialize the first time-indexed text string and the second time-indexed text string by removing case from words of the first time-indexed text string and the second time-indexed text string, removing punctuation from the first time-indexed text string and the second time-indexed text string, and/or converting numerals in the first time-indexed text string and the second time-indexed text string into text.

13. The system of claim 11, wherein the word matching component is further configured to:
identify a boxed match range within the first and second time-indexed text strings, wherein the boxed match range includes a first word from the first time-indexed text string and a second word from the second time indexed text string, wherein the first word and the second word are surrounded on both sides within the first or second time-indexed text strings by a beginning of the first or second time-indexed text strings, an end of the first or second time-indexed text strings, an anchor word, or a matched word.

14. The system of claim 11, wherein the initialization component is further configured to:
receive a first confidence score and a second confidence score, wherein the first confidence score is associated with a first word from the first time-indexed text string, and the second confidence score is associated with a second word from the second time-indexed text string, wherein the first word does not match the second word, and wherein the first word is included in the hybrid text string if the first confidence score is greater than the second confidence score.

15. The system of claim 11, wherein:
the initialization component is further configured to:
receive at least two confidence scores associated with at least two words from the first time-indexed text string and a confidence score associated with a word from the second time-indexed text string, and
the word matching component is further configured to:
identify an area of uncertainty within the first and second time-indexed text strings, wherein the area of uncertainty includes the at least two words from the first time-indexed text string and the word from the second time-indexed text string; and
compute an average of the at least two confidence scores associated with the at least two words from the first time-indexed text string, wherein the at least two words from the first time-indexed text string are included in the hybrid text string if the average of the at least two confidence scores associated with the at least two words from the first time-indexed text string is greater than the confidence score associated with the word from the second time-indexed text string.

16. The system of claim 11, wherein the first automated speech recognition system and the second automated speech recognition system comprise a same automated speech recognition system, wherein the first automated speech recognition system includes a different configuration from the second automated speech recognition system.

17. The system of claim 11, wherein the first automated speech recognition system and the second automated speech recognition system comprise different automated speech recognition systems.

18. A method of creating a hybrid text string, wherein the method is performed by a computing system having a processor and a memory, the method comprising:
receiving at least two different time-indexed text strings,
wherein the two different time-indexed text strings are generated from the same audio input,
wherein the audio input includes spoken words, and
wherein two different time-indexed text strings were produced from either two different automated speech recognition systems, or the same automated speech recognition system with two different configurations or settings;
correlating the two different time-indexed text strings based at least in part on a comparison of the two different time-indexed text strings to compensate for time differences between the two different time-indexed text strings; and
creating a hybrid text string, wherein the hybrid text string includes words that match between the two different time-indexed text strings, and
when a word does not match between the two different time-indexed text strings, the hybrid text string includes a higher probability word from one of the two different time-indexed text strings.

19. The method of claim 18, further comprising:
identifying at least one matching word in each of the two different time-indexed text strings; and
correlating the two different time-indexed text strings based at least in part on the at least one matching word.

20. The method of claim 18, wherein correlating the two different time-indexed text strings is based at least in part on a differing start time between the two different time-indexed text strings.

21. A system for creating a text string, the system comprising:
an initialization component configured to:
receive a first time-indexed text string generated from an audio input by a first automated speech recognition system;
receive a second time-indexed text string generated from the audio input by a second automated speech recognition system; and
correlate the first and second time-indexed text strings based at least in part on a comparison between the first and second time-indexed text strings to compensate for time difference between the first and second time-indexed text strings; and
a string generation component configured to:
create an improved text string, wherein the improved text string is generated from a comparison between the first and second time-indexed text strings, and
wherein the improved text string includes at least one word that matches between the first time-indexed text string and the second time-indexed text string.

22. The method of claim 21, wherein the first automated speech recognition system and the second automated speech recognition system comprise a same automated speech recognition system, but wherein the first automated speech recognition system includes a different configuration from the second automated speech recognition system.

23. The method of claim 21, wherein the first automated speech recognition system and the second automated speech recognition system comprise different automated speech recognition systems.

24. A system for creating a hybrid text string, the system comprising:
means for receiving first and second time-indexed text strings generated from an audio input by first and second automated speech recognition systems, respectively;
means for identifying at least one anchor word, wherein the at least one anchor word is associated with an anchor word point,
wherein the at least one anchor word is a word having a high probability of being correctly recognized by both the first and second automated speech recognition systems, and,
wherein the anchor word point is located at a time location $t_1$ in the first time-indexed text string and at a time location $t_2$ in the second time-indexed text string, wherein the time locations $t_1$ and $t_2$ are different;
means for calculating a match vector, wherein the match vector is associated with a variance between the time location $t_1$ in the first time-indexed text string and the time location $t_2$ in the second time-indexed text string;
means for identifying at least one matched word, wherein the at least one matched word is located at a time location $t_3$ in the first time-indexed text string and at a differing time location $t_4$ in the second time-indexed text string; and,
means for creating a hybrid text string, wherein the hybrid text string includes the at least one anchor word and the at least one matched word, and wherein the hybrid text string includes at least one word from the first time-indexed text string that has a higher probability of being correctly recognized than a corresponding word in the second time-indexed text string.

* * * * *